United States Patent
Su et al.

(10) Patent No.: US 8,493,376 B2
(45) Date of Patent: Jul. 23, 2013

(54) DRIVER CIRCUIT STRUCTURE

(75) Inventors: Kuo-Chang Su, Hsinchu (TW);
Chun-Hsin Liu, Hsinchu (TW);
Min-Feng Chiang, Hsinchu (TW)

(73) Assignee: AU Optronics Corp., Hsinchu (TW)

( * ) Notice: Subject to any disclaimer, the term of this patent is extended or adjusted under 35 U.S.C. 154(b) by 765 days.

(21) Appl. No.: 12/652,154

(22) Filed: Jan. 5, 2010

(65) Prior Publication Data

US 2010/0315401 A1   Dec. 16, 2010

(30) Foreign Application Priority Data

Jun. 15, 2009  (TW) ................ 98119886 A

(51) Int. Cl.
*G06F 3/038* (2006.01)
*G06G 5/00* (2006.01)

(52) U.S. Cl.
USPC .......................... 345/211; 345/92; 327/524

(58) Field of Classification Search
USPC ........ 345/87, 92, 98–100, 211–213; 327/524, 327/589
See application file for complete search history.

(56) References Cited

U.S. PATENT DOCUMENTS

2009/0174649 A1* 7/2009 Kim .......................... 345/104

FOREIGN PATENT DOCUMENTS

CN   101191964   6/2008

OTHER PUBLICATIONS

English language translation of abstract of CN 101191964 (published Jun. 4, 2008).

* cited by examiner

*Primary Examiner* — Kimnhung Nguyen
(74) *Attorney, Agent, or Firm* — McClure, Qualey & Rodack, LLP

(57) ABSTRACT

Disclosed is a driver circuit structure integrated in a display panel. The driver circuit structure includes a plurality of transistors and a backup transistor. After completing the driver circuit structure, the disclosure inspects it to find an inactive transistor. The inspection process first, isolates the electrical connection between the inactive transistor and the first electrode line and/or the electrical connection between the inactive transistor and the second electrode line. Next, the source electrode of the backup transistor and the first electrode line and/or electrically connecting the drain electrode of the backup transistor and the second electrode line are electrical connected.

8 Claims, 11 Drawing Sheets

DRIVER CIRCUIT STRUCTURE

CROSS REFERENCE TO RELATED APPLICATIONS

This Application claims priority of Taiwan Patent Application No. 098119886, filed on Jun. 15, 2009, the entirety of which is incorporated by reference herein.

BACKGROUND OF THE DISCLOSURE

1. Field of the Disclosure

The present disclosure relates to a gate driver on array (GOA) structure integrated in a display panel, and in particular relates to a repairable GOA structure and a display panel utilizing the same.

2. Description of the Related Art

Liquid crystal displays (LCD) are widely applied in electronic display products such as televisions, laptop computers, mobile phones, personal digital assistants (PDA), and the likes. An LCD includes a data driver, scan driver, and liquid crystal display panel, wherein the liquid crystal display panel has a pixel array, and the corresponding pixel rows of the pixel array are sequentially switched on by the scan driver, such that the data driver may transfer the pixel data to the pixels to display images.

Gate drivers and source drivers are mostly adopted in numerous panel designs to produce gate pulse signals and data signals. Because the polycrystalline silicon made of the low temperature polycrystalline silicon (LTPS) process has higher mobility and high practicability, the LTPS process is widely applied to manufacturing circuits on glass. The amorphous silicon has lower mobility, however, its cost is lower. Recently, application of the amorphous silicon process is used to form circuits on the glass, such as gate driver shift registers (so-called integrated driver circuits).

A gate driver on array (GOA) product has shift register circuits on a glass substrate. The products however, during an array process, easily deteriorate due to low process stability. For example, some transistors of the shift registers would not be able to normally work due to process particles thereon. In such a case, the shift transistors including only one inactive transistor would not operate. Therefore, cost and yield of the GOA products are dramatically influenced.

BRIEF SUMMARY OF THE DISCLOSURE

The disclosure provides a driver circuit structure integrated in a display panel, and the driver circuit structure comprising: a plurality of transistors, wherein each of the transistors has a source electrode electrically connected to a first electrode line, and a drain electrode electrically connected to a second electrode line, respectively; and a backup transistor, wherein the backup transistor has a source electrode not electrically connected to the first electrode line, and/or a drain electrode not electrically connected to the second electrode line.

The disclosure further provides a method for repairing a driver circuit structure, comprising: inspecting the driver circuit structure to find an inactive transistor; electrically isolating the connection between the inactive transistor and the first electrode line and/or the connection between the inactive transistor and the second electrode line; and electrically connecting a backup transistor source electrode and the first electrode line and/or electrically connecting a backup transistor drain electrode and the second electrode line, wherein the number of the electrically isolated inactive transistors is similar to the number of the electrically connected backup transistors.

A detailed description is given in the following embodiments with reference to the accompanying drawings.

BRIEF DESCRIPTION OF THE DRAWINGS

The present disclosure can be more fully understood by reading the subsequent detailed description and examples with references made to the accompanying drawings, wherein.

DETAILED DESCRIPTION OF THE DISCLOSURE

The following description is of the best-contemplated mode of carrying out the disclosure. This description is made for the purpose of illustrating the general principles of the disclosure and should not be taken in a limiting sense. The scope of the disclosure is best determined by reference to the appended claims.

Figure 1:
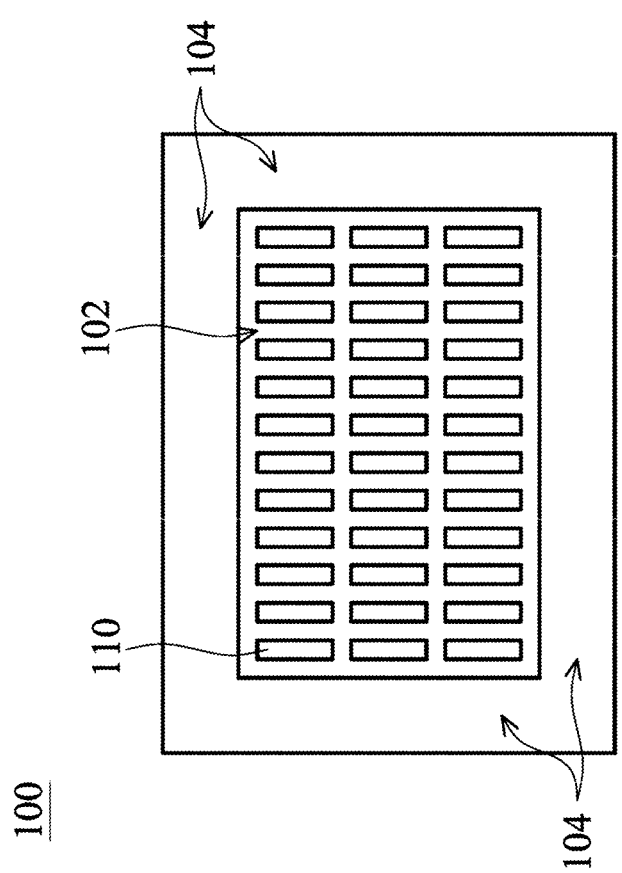
FIG. 1 is a diagram showing a display panel in one embodiment of the disclosure.

As shown in FIG. 1, the display panel 100 has a display region 102 and a peripheral line region 104 surrounding the display region 102. The display region 102 has a plurality of pixels 110, and the peripheral line region 102 has a gate driver on array structure. The gate driver on array structure has high ratio of channel width to channel length, thereby improving the response rate and the resolution of the display panel 100. However, it is difficult to repair the electrode of the gate driver on array structure when it is polluted, such that the display effect of the pixels 110 will be influenced. As such, the disclosure provides a design about the gate driver on array structure (shift register), wherein the gate driver on array structure is composed of a plurality of thin film transistors electrically connected in parallel. Even if part of the conductive pattern is short due to process particles, it can still be repaired to enhance the display panel 100 yield and further improve the visual quality.

Figure 2:
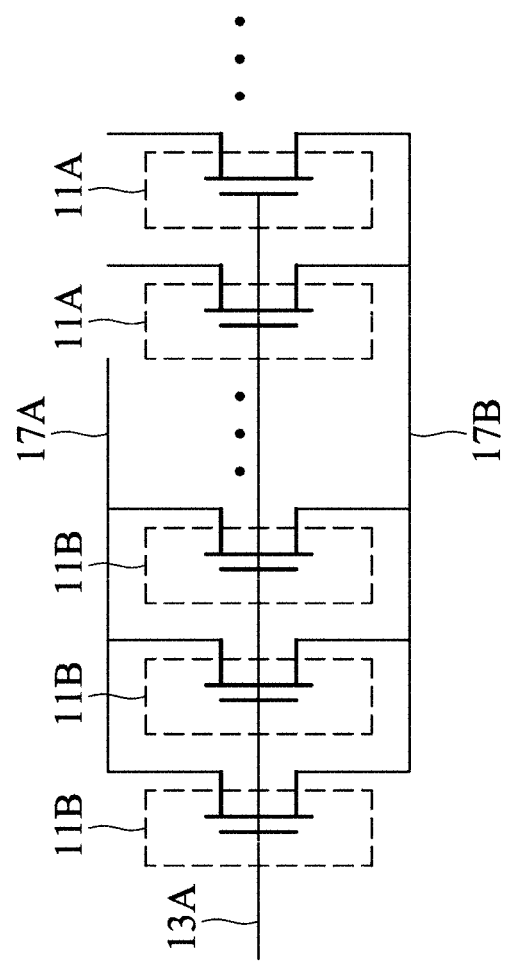
FIG. 2 is a circuit diagram of a driver circuit structure in one embodiment of the disclosure.

FIG. 2 shows a circuit diagram of a driver circuit structure, integrated in a display panel, serving as a gate driver on array structure or a shift register in the display panel. The driver circuit structure includes a plurality of transistors 11B, wherein each of the transistors 11B has a source electrode electrically connected to a first electrode line 17A, and each of the transistors 11B has a drain electrode electrically connected to a second electrode line 17B. The driver circuit structure further includes a backup transistor 11A, and the source electrode of the backup transistor is not electrically connected to the first electrode line 17A. If some transistor 11B is polluted by the particle and being inactive, the connection between the source electrode of the polluted transistor 11B and the first electrode line 17A can be electrically isolated, and the source electrode of the backup transistor 11A can be electrically connected to the first electrode line 17A. The number of transistors after repair is not changed. For example, the driver circuit structure has eight transistors 11B and four backup transistors 11A, and two transistors are polluted by process particles. Thereafter, the electrical connection between the source electrode of the two polluted transistors 11B and the first electrode line 17A is isolated, and the source electrode of the two backup transistors 11A is electrically connected to the first electrode line 17A. Accordingly, the repaired driver circuit structure still has eight normal transistors.

In one embodiment, the backup transistor 11A is located on the terminal of the driver circuit structure. In another embodiment, the backup transistor 11A is inserted between the transistors 11B.

The described repair process may not only isolate the electrical connection between the source electrode of the polluted transistor 11B and the first electrode line 17A, but also further isolate the connection between the drain electrode of the polluted transistor 11B and the second electrode line 17B.

As shown in FIG. 2, the source electrode of the backup transistor 11A is not electrically connected to the first electrode line 17A before the repair process. In another embodiment, the drain electrode of the backup transistor 11A is not electrically connected to the second electrode line 17B before the repair process. In a further embodiment, both of the source electrode and the drain electrode of the backup transistor 11A are not electrically connected to the first electrode line 17A and the second electrode line 17B before the repair process. Thus, it is important that the backup transistor 11A is not effective before the repair process. The source and drain electrodes of the backup transistor 11A will electrically connect to the first electrode line 17A and the second electrode line 17B, respectively, thereby replacing the electrically isolated transistor 11B.

Figure 3A:
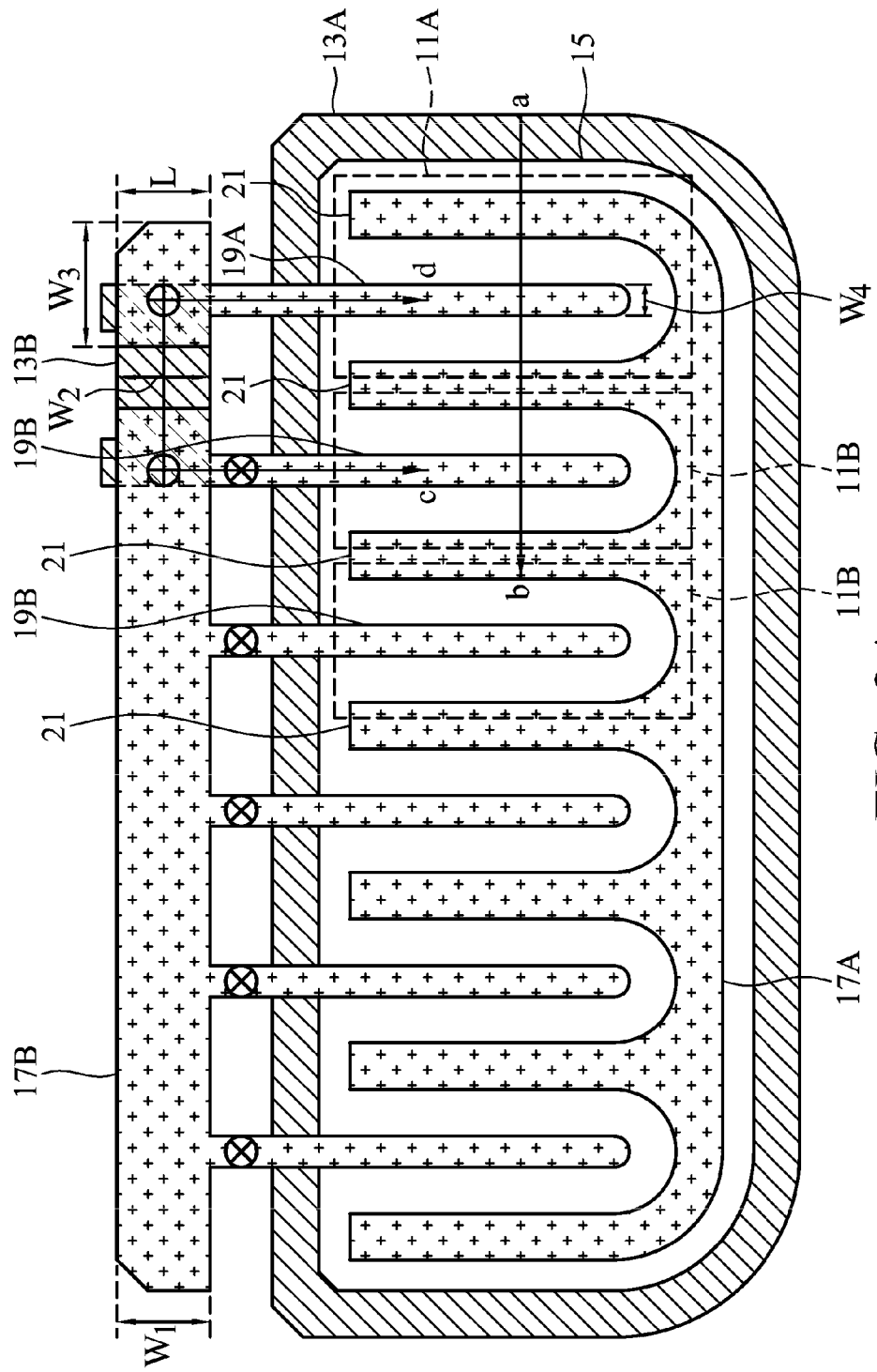
FIGS. 3A-3B are top views of a driver circuit structure in one embodiment of the disclosure.
Figure 4:
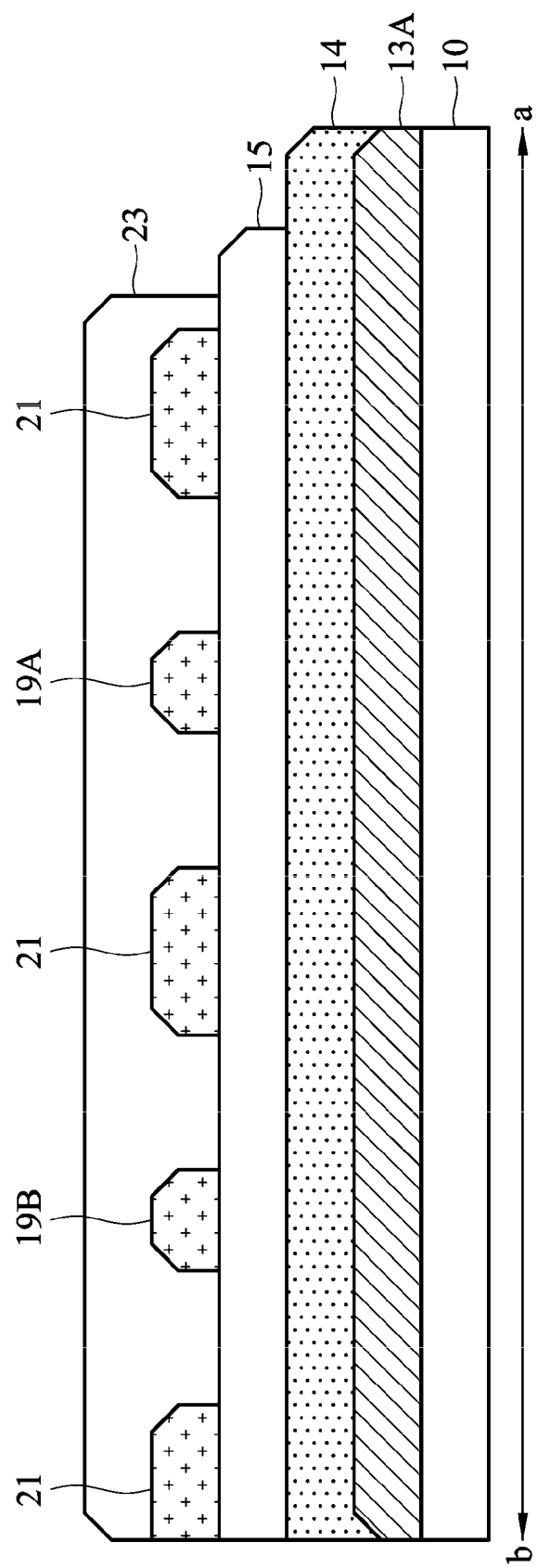
FIG. 4 is a cross sectional view of a cross section line a-b in a driver circuit structure in one embodiment of the disclosure.
Figure 5:
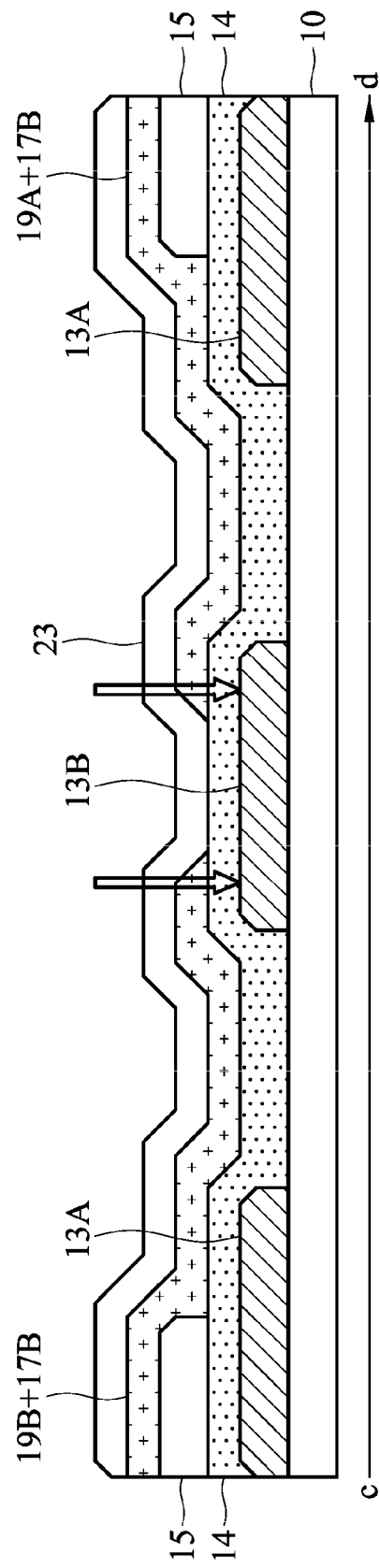
FIG. 5 is a cross sectional view of a cross section line c-d in a driver circuit structure before a repair process in one embodiment of the disclosure.

FIG. 3A shows the top view of the described driver circuit structure, FIG. 4 shows the sectional view of line a-b in FIG. 3A, and FIG. 5 shows the sectional view of line c-d in FIG. 3A. Note that the driver circuit structure in FIG. 3A is only for illustration and does not limit the disclosure. For example, a gate electrode layer, a semiconductor layer, and a source/drain electrode layer are sequentially formed on the substrate of the driver circuit structure in FIG. 3A. In other embodiments, however, a source/drain electrode, a semiconductor layer, and a gate electrode layer are sequentially formed on a substrate.

The method for manufacturing the driver circuit structure in FIG. 3A is described below. Please also reference FIGS. 4 and 5 for clarity. First, a substrate 10 is provided. The substrate 10 can be transparent material such as glass, quartz, or other suitable transparent materials; opaque material such as ceramic, wafer, or other suitable opaque materials; or flexible material such as plastic, rubber, polyester, polycarbonate, or other suitable flexible materials. Subsequently, a first conductive layer (not shown) is formed on the substrate. The first conductive layer includes metal such as Ti, Ta, Ag, Au, Pt, Cu, Al, Mo, Nd, W, Cr, Rh, Re, Ru, Co, other suitable metals, or alloys thereof; and metal oxide such as indium tin oxide (ITO), indium zinc oxide (IZO), or multi-layered structures thereof. A lithography process is performed on the first conductive layer and following an etching step is performed to define a gate electrode layer 13A and a contact pad 13B. As shown in FIG. 3A, the gate electrode 13A and the contact pad 13B are separated by a distance, and they are not electrically connected.

Next, a first insulation layer 14 is formed on the gate electrode layer 13A and the contact pad 13B, and a semiconductor layer 15 is formed overlying the first insulation layer 14 on the gate electrode layer 13A. The first insulation layer 14 can be organic material such as photoresist, organic silicon compound, or other suitable organic materials; inorganic material such as silicon nitride, silicon oxide, silicon oxynitride, silicon oxycarbide, silicon carbide, or other suitable inorganic materials; or combinations thereof. The semiconductor layer 15 includes typical semiconductor material such as amorphous silicon, polycrystalline silicon, microcrystalline silicon, single crystalline silicon, or combinations thereof. The formation of the semiconductor layer 15 can be by chemical vapor deposition (CVD), plasma-enhanced chemical vapor deposition (PECVD), rapid thermal chemical vapor deposition (RTCVD), ultra-high vacuum chemical vapor deposition (UHV/CVD), or molecular beam epitaxy (MBE).

Next, a second conductive layer (not shown) is formed on the semiconductor layer 15 and the first insulation layer 14. The second metal layer includes metal such as Ti, Ta, Ag, Au, Pt, Cu, Al, Mo, Nd, W, Cr, Rh, Re, Ru, Co, other suitable metals, alloys thereof, or multi-layered structures thereof. A lithography process is performed on the second conductive layer and following and etching step is performed to define the first electrode line 17A, the source electrodes 21 of the transistors 11B and the backup transistor 11A, the second electrode line 17B, the drain electrode 19A of the backup transistor 11A, and the drain electrodes 19B of the transistors 11B. As shown in FIG. 2, the first electrode line 17A electrically connects to the source electrodes 21 of the transistors 11B and the backup transistor 11A, and the second electrode line 17B only electrically connects to the drain electrode 19B of the transistor 11B. As shown in FIG. 3A, the backup transistor 11A is located at the outer side of the transistors 11B, and the contact pad 13B is located at the terminal of the second electrode line 17B. The second electrode line 17B overlaps part of the contact pad 13B, and drain electrode 19A of the backup transistor 11A extends to define an extending part on the contact pad 13B. The extending part of the drain electrode 19A of the backup transistor 11A on the contact pad 13B has a width $W_3$ greater than the width $W_4$ of the drain electrode 19A of the backup transistor 11A, and the extending part of the drain electrode 19A of the backup transistor 11A, on the contact pad 13B has a length L similar to the width $W_2$ of the contact pad 13B and the width $W_1$ of the second electrode line 17B. Therefore, a subsequent laser welding process may electrically connect the contact pad 13B and the second electrode line 17B without misalignment risk, and electrically connect the contact pad 13B and the drain electrode 19A of the backup transistor 11A on the contact pad 13B without misalignment risk.

Finally, a second insulation layer 23 is formed to cover the described structure. Material selection and the formation method of the second insulation layer 23 are similar to that of the first insulation layer 14, and the insulation layers 14 and 23 may adopt same or different materials. The description of a driver circuit structure in one embodiment of the disclosure is completed.

Figure 6:
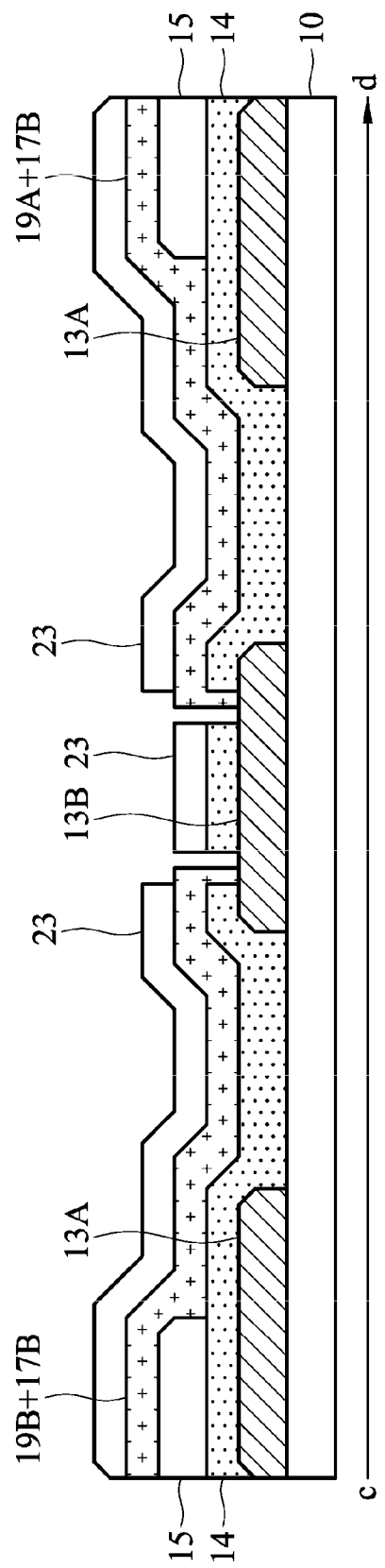
FIG. 6 is a cross sectional view of a cross section line c-d in a driver circuit structure after a repair process in one embodiment of the disclosure.

After completing the described driver circuit structure, the transistors 11B are inspected by image matching and the likes to check them being clean or polluted. If some transistor 11B is polluted, the electrical connection ⊗ between the drain electrode 19B of the polluted transistor 11B and the second electrode line 17B is isolated by laser ablation, the contact pad 13B and the second electrode line 17B are electrically connected in their overlap region ⊕ by laser welding and the likes, and the contact pad 13B and the backup transistor drain electrode 19A are electrically connected in their overlap region ⊕ by laser welding and the likes. FIGS. 5 and 6 show the structure before and after the laser welding, respectively. The laser is applied to burn through the first insulation layer 14 between the drain electrode 19A of the backup transistor 11A and the contact pad 13B and the first insulation layer 14 between the terminal of the second electrode line 17B and the contact pad 13B. Simultaneously, the laser also melts part of the drain electrode 19A of the backup transistor 11A and terminal part of the second electrode line 17B to electrically connect the contact pad 13B.

Figure 3B:
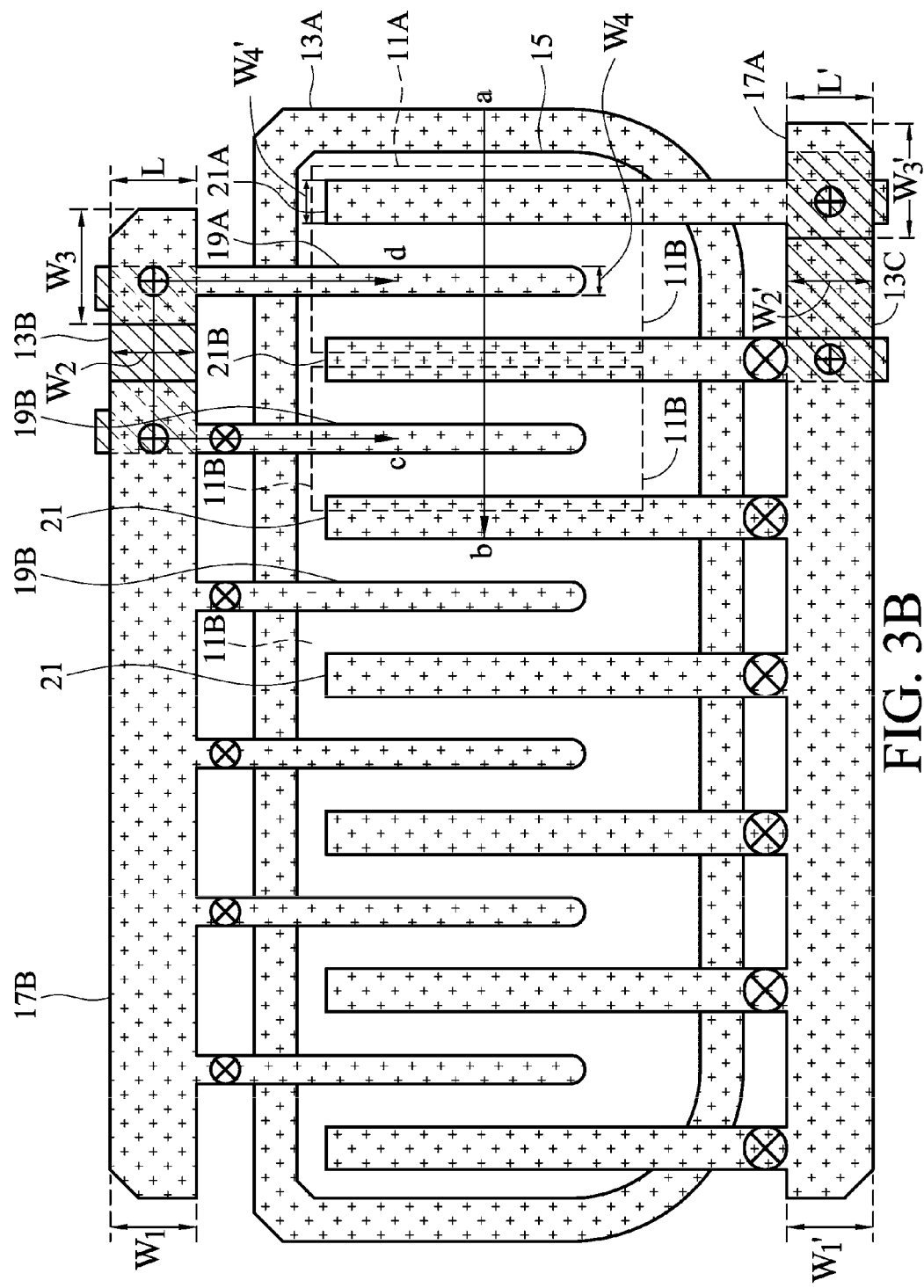

In another embodiment, the first electrode line 17A may be disposed besides the gate electrode layer 13A and the semiconductor layer 15 as shown in FIG. 3B. As such, the source electrode 21 of the backup transistor 11A can be electrically isolated from the first electrode line 17A. The first electrode line 17A may adopt the design of the second electrode line 17B and the corresponding contact pad 13B. The first electrode line 17A overlaps part of another contact pad 13C. The source electrode 21 of the backup transistor 11A extends to define an extending part on another contact pad 13C. In this embodiment, the backup transistor 11A is located at the outside of the transistors 11B, and another contact pad 13C is located at the terminal of the first electrode line 17A. The extending part of the backup transistor source electrode 21 on another contact pad 13C has a width W3' greater than the width W4' of the backup transistor source electrode 21A, and the extending part of the backup transistor source electrode 21A on another contact pad 13C has a length L' similar to the width of another contact pad and the width W1' of the first electrode line 17A. Therefore, a subsequent laser welding process may electrically connect another contact pad 13C and the first electrode line 17A without misalignment risk, and electrically connect another contact pad 13C and the extending part of the backup transistor source electrode 21A on another contact pad 13C without misalignment risk. After completing the described driver circuit structure, the transistors 11B are inspected by image matching and the likes to check if they are polluted. If some transistors 11B are polluted, the electrical connection ⊗ between the source electrode 21B of the polluted transistor 11B and the first electrode line 17A is isolated by laser ablation, another contact pad 13C and the first electrode line 17A are electrically connected in their overlap region by laser welding and the likes, and another contact pad 13C and the backup transistor source electrode 21A are electrically connected in their overlap region by laser welding and the likes. Similar to the structure before and after the laser welding in FIGS. 5 and 6, the laser is applied to burn through the first insulation layer 14 between the source electrode 21 of the backup transistor 11A and another contact pad 13C and the first insulation layer 14 between the terminal of the first electrode line 17A and another contact pad 13C. Simultaneously, the laser also melts part of the source electrode 21A of the backup transistor 11A and terminal part of the first electrode line 17A to electrically connect another contact pad 13C. It is understood that if another contact pad 13C is adopted with the backup transistor source electrode 21A electrically isolated from the first electrode line 17A, the contact pad 13B can be omitted and the second electrode line 17B may electrically connect the drain electrode 19A of the backup transistor 11A.

Figure 7A:
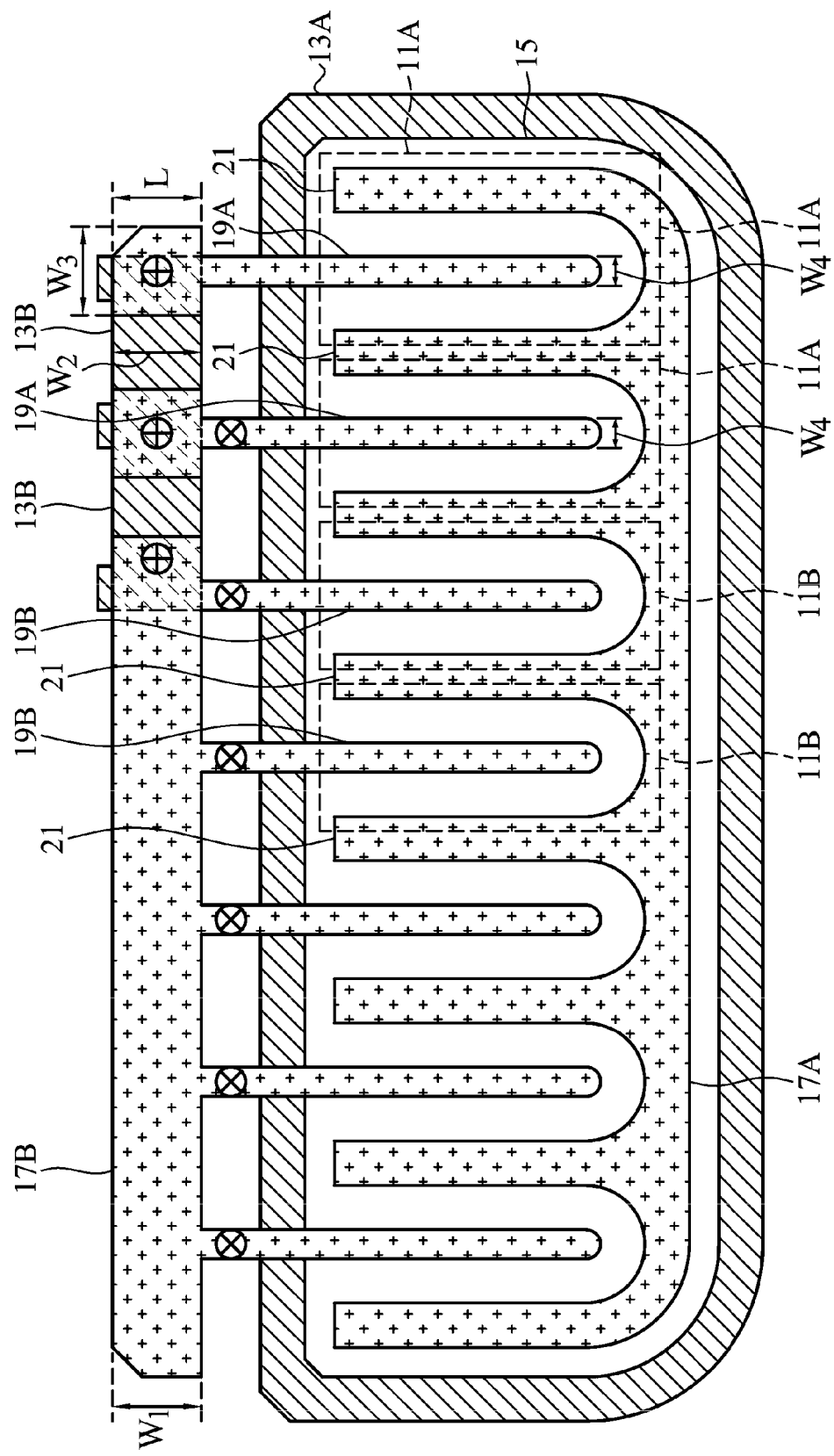
FIGS. 7A-7B are top views of a driver circuit structure in one embodiment of the disclosure.
Figure 7B:
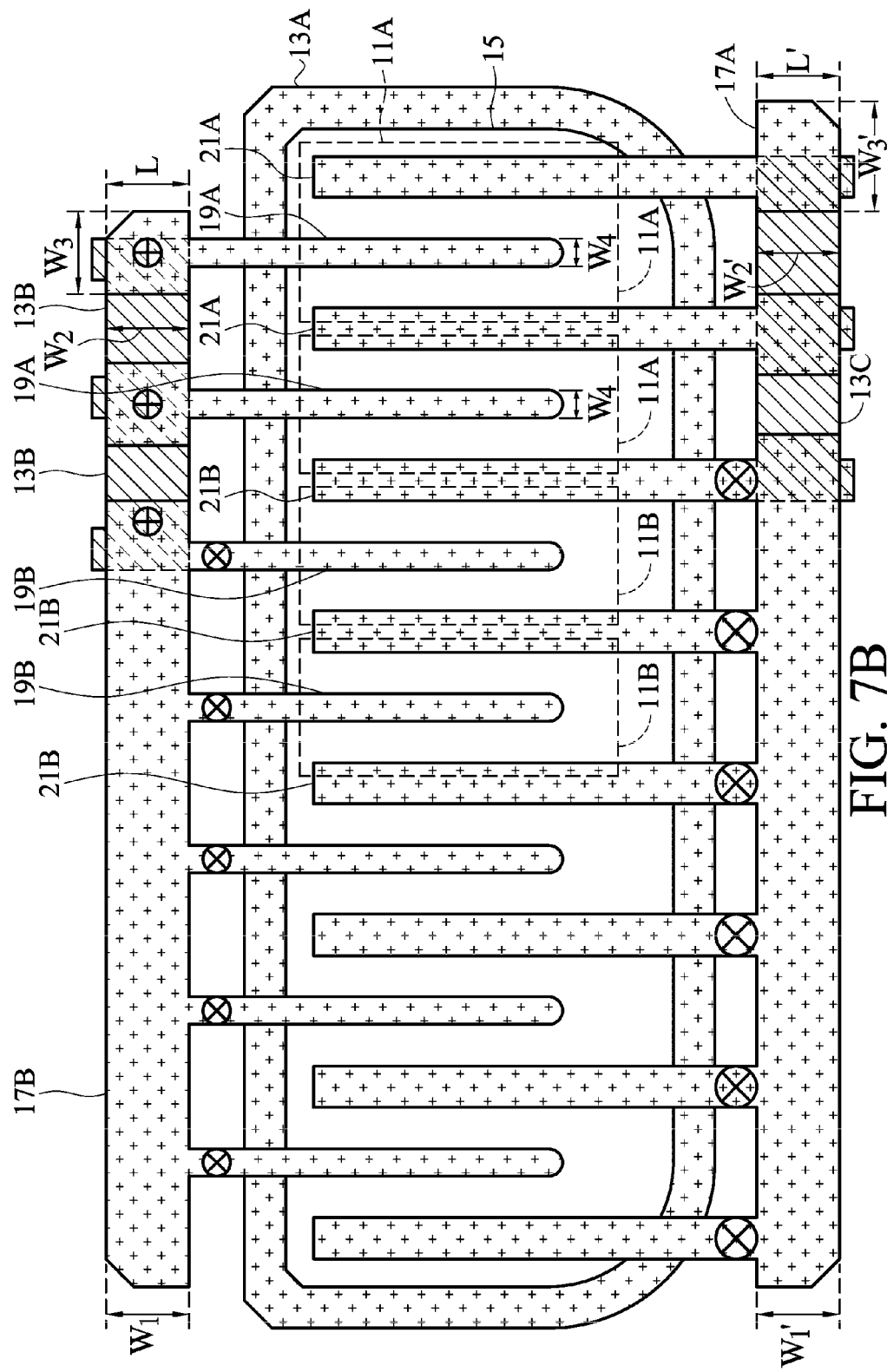

In FIG. 3A, the driver circuit structure only includes one backup transistor 11A. In another embodiment, it includes a plurality of the backup transistors 11A as shown in FIG. 7A. If more than one of the transistors 11B are polluted by the particles, they are replaced with more than one of the backup transistors 11A provided by the driver circuit structure in FIG. 7A. After image matching, the electrical connection ⊗ between the drain electrode 19B of the polluted transistor 11B and the second electrode line 17B is isolated by laser ablation, the contact pad 13B and the second electrode line 17B are electrically connected in their overlap region ⊕ by laser welding and the likes, and the contact pad 13B and the drain electrode 19A of the backup transistor 11A are electrically connected in their overlap region ⊕ by laser welding and the likes. It is understood that the number of the electrically connected backup transistors is similar to the number of the inactive transistors. For example in FIG. 7A, if the inactive transistor 11B is only one, it will only need to electrically connect the right-sided or left-sided backup transistor 11A other than both backup transistors 11A. Similarly, the first electrode line 17A may be disposed besides the gate electrode layer 13A and the semiconductor layer 15 as shown in FIG. 7B. As such, the source electrode 21A of the backup transistor 11A can be electrically isolated from the first electrode line 17A. The first electrode line 17A may adopt the design of another contact pad 13C as described above. The design and relative repair process of the other contact pad 13C is similar to the previous description.

Figure 8A:
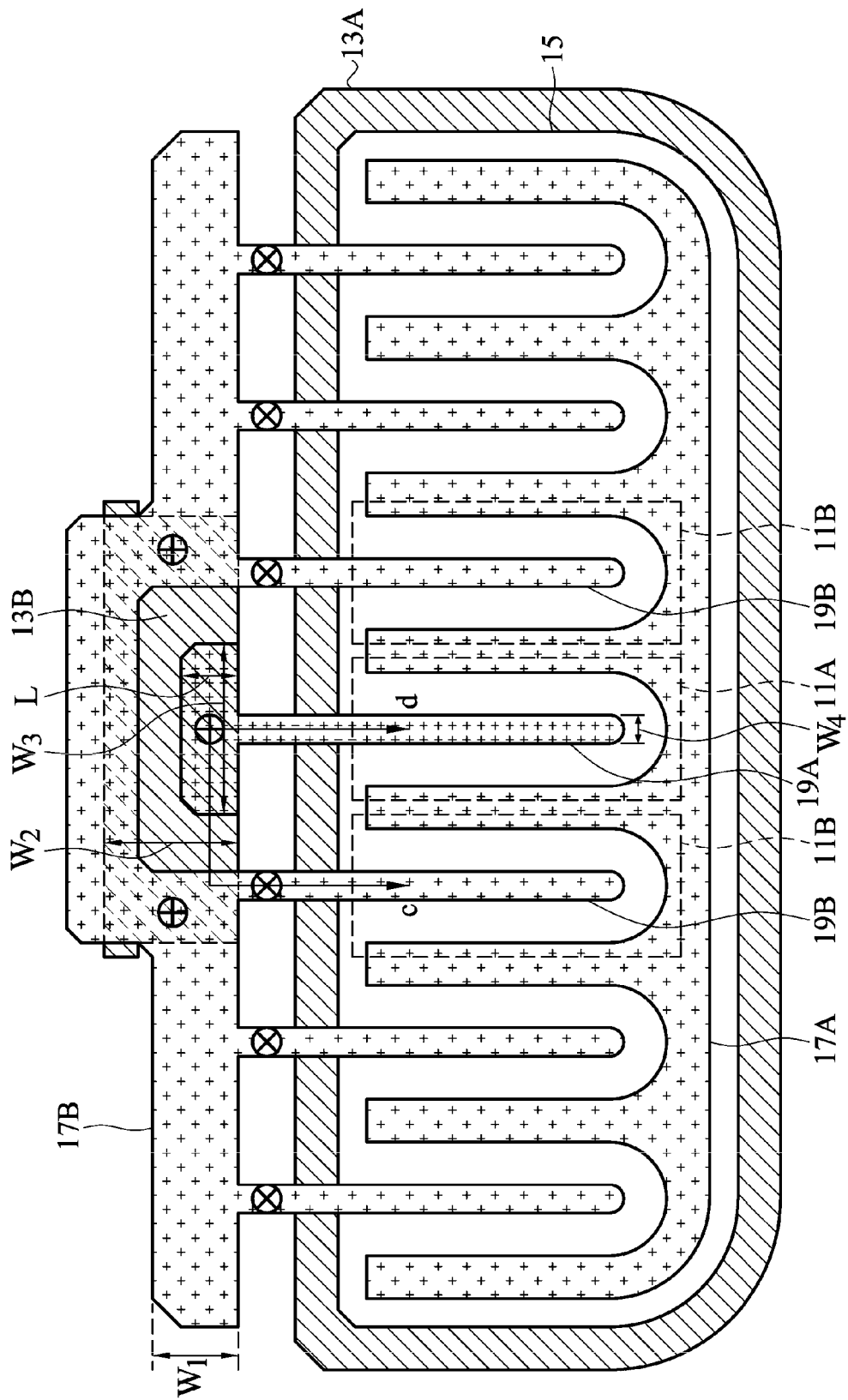
FIGS. 8A-8B are top views of a driver circuit structure in one embodiment of the disclosure.

The backup transistors 11A in FIG. 6 are located in the outside of the transistors 11B. In another embodiment, the backup transistor may be disposed between the transistors as shown in FIG. 8A, wherein the electrode line has a meander line structure to collocate the contact pad. As shown in FIG. 8A, the backup transistor 11A is located between the transistors 11B, and the second electrode line 17B has a meander line structure in the overlap region of the contact pad 13B and the second electrode line 17B, wherein the meander line structure has a convex part protruding from the second electrode line 17B and a concave part overlapping the contact pad 13B. The extending part of the backup transistor drain electrode 19A on the contact pad 13B has a width $W_3$ greater than the width $W_4$ of the backup transistor drain electrode 19A, and the extending part of the backup transistor drain electrode 19A on the contact pad 13B has a length L less than the width $W_1$ of the second electrode line 17B. Therefore, a subsequent laser welding process may electrically connect the contact pad 13B and the second electrode line 17B without misalignment risk, and electrically connect the contact pad 13B and the extending part of the backup transistor drain electrode 19A on the contact pad 13B without misalignment risk.

After completing the described driver circuit structure, the transistors 11B are inspected by image matching and the likes to check if they are polluted. If some transistors 11B are polluted, the electrical connection ⊗ between the drain electrode 19B of the polluted transistor 11B and the second electrode line 17B is isolated by laser ablation, the contact pad 13 and the concave part of the meander line structure of the second electrode line 17B are electrically connected in their overlap region (not symbolized) by laser welding and the likes, and the contact pad 13B and the backup transistor drain electrode 19A are electrically connected in their overlap region ⊕ by laser welding and the likes. The laser welding process applied to electrically connect the backup transistor drain electrode 19A, the second electrode line 17B, and the contact pad 13B is shown in FIG. 5 and, in FIG. 6, the cross sectional views of the c-d line before and after the laser welding is shown. The first insulation layer 14 between the contact pad 13B and the drain electrode 19A of the backup transistor 11A and between the contact pad 13B and the concave part of the meander line structure of the second electrode line 17B is burnt through by laser. Simultaneously, part of the drain electrode 19A of the backup transistor 11A and concave part of the meander line structure of the second electrode line 17B are melt to electrically connect the contact pad 13B.

Figure 8B:
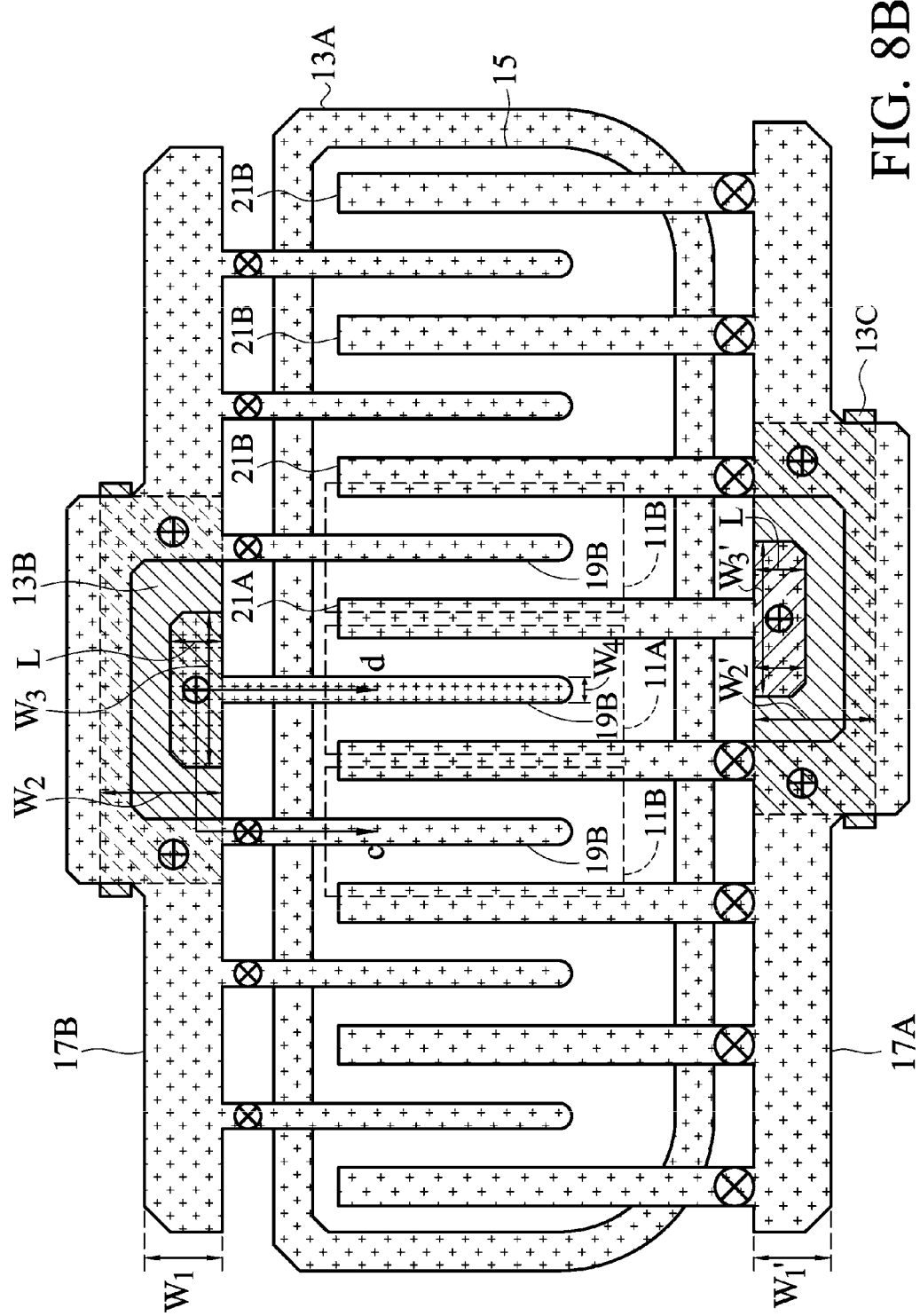

The described meander line structure is benefit to form several individual backup transistors 11A. Even if some backup transistors are polluted, the other clean backup transistors 11A, the second electrode line 17B, and the contact pad 13B can still be electrically connected. As such, it is not necessary to electrically connect the polluted backup transistors 11A, and then electrically isolate the electrical connection ⊗ between the extending part of the source electrode 19A on the contact pad 13 and the drain electrode 19A, as shown in FIG. 7A. Similarly, the first electrode line 17A in FIG. 8A may locate besides the gate electrode layer 13A and the semiconductor layer 15, and further has the meander line structure of the second electrode line 17B. Accordingly, the backup transistor 11A located between the transistors 11B may not electrically connect to the first electrode line 17A, and may adopt designs of another contact pad 13C as shown in FIG. 8B. The design and relative repair process of the first electrode line 17A having the meander line structure and a corresponding contact pad 13C is similar to the previous descriptions.

In a further embodiment, the meander line structure in FIGS. 8A-8B can be collocated with the designs in FIGS. 3A-3B or FIGS. 7A-7B. The described technique allows the number of transistors after repair to remain the same as that before repair, thereby efficiently enhancing product yield.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A driver circuit structure integrated in a display panel, and the driver circuit structure comprising:
   a plurality of transistors, wherein each of the transistors has a source electrode electrically connected to a first electrode line, and a drain electrode electrically connected to a second electrode line, respectively;
   a backup transistor, wherein the backup transistor has a source electrode not electrically connected to the first electrode line, and/or a drain electrode not electrically connected to the second electrode line;
   a gate electrode layer and a contact pad on a substrate;
   a first insulation layer on the gate electrode layer and the contact pad; and
   a semiconductor layer overlying the first insulation layer on the gate electrode layer, wherein:
   the source/drain electrodes of the transistors are on the semiconductor layer, and the source/drain electrodes of the transistors are electrically connected to the first/second electrode lines, respectively;
   the first electrode line and/or the second electrode line overlap part of the contact pad; and
   the backup transistor has a source electrode and/or a drain electrode extending to define an extending part on the contact pad.

2. The driver circuit structure as claimed in claim 1, wherein the backup transistor is located at the outer side of the transistors, and the contact pad is located at the terminal of the first electrode line and/or the second electrode line.

3. The driver circuit structure as claimed in claim 2, wherein the width of the extending part of the source electrode and/or the drain electrode of the backup transistor is greater than the width of the source electrode and/or the drain electrode of the backup transistor, and wherein the length of the extending part of the source electrode and/or the drain electrode of the backup transistor, the width of the contact pad, and the width of the first electrode line and/or the second electrode line are same.

4. The driver circuit structure as claimed in claim 1, wherein the backup transistor is located between the transistors, and the first electrode line and/or the second electrode line has a meander line structure in the overlap region of the contact pad and the first electrode line and/or the second electrode line, and the meander line structure has a convex part protruding from the first electrode line and/or the second electrode line and a concave part overlapping the contact pad.

5. The driver circuit structure as claimed in claim 4, wherein the width of the extending part of the source electrode and/or the drain electrode of the backup transistor is greater than the width of the source electrode and/or the drain electrode of the backup transistor, and wherein the length of the extending part of the source electrode and/or the drain electrode of the backup transistor is less than the width of the first electrode line and/or the second electrode line.

6. The driver circuit structure as claimed in claim 1, wherein the source electrodes of the transistors are connected in parallel, and/or the drain electrodes of the transistors are connected in parallel.

7. The driver circuit structure as claimed in claim 1 is applied as a gate driver on array structure or a shift register of a display panel.

8. The driver circuit structure as claimed in claim 1, wherein the transistors and the backup transistor have similar structures.

* * * * *